(12) United States Patent
Venkatesan et al.

(10) Patent No.: US 11,734,208 B2
(45) Date of Patent: *Aug. 22, 2023

(54) FLASH MEMORY DEVICE HAVING A CALIBRATION MODE

(71) Applicant: Rambus Inc., San Jose, CA (US)

(72) Inventors: Pravin Kumar Venkatesan, Fremont, CA (US); Liji Gopalakrishnan, Sunnyvale, CA (US); Kashinath Ullhas Prabhu, Bangalore (IN); Makarand Ajit Shirasgaonkar, Bangalore (IN)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,446

(22) Filed: Dec. 15, 2022

(65) Prior Publication Data

US 2023/0119579 A1 Apr. 20, 2023

Related U.S. Application Data

(63) Continuation of application No. 17/849,450, filed on Jun. 24, 2022, which is a continuation of application No. 16/709,506, filed on Dec. 10, 2019, now Pat. No. 11,372,784, which is a continuation of application No. 16/145,837, filed on Sep. 28, 2018, now Pat. No. 10,509,741, which is a continuation of application No. 15/616,785, filed on Jun. 7, 2017, now Pat. No. 10,089,256, which is a continuation of application No. 14/080,724, filed on Nov. 14, 2013, now Pat. No. 9,715,467.

(60) Provisional application No. 61/730,018, filed on Nov. 26, 2012.

(51) Int. Cl.
*G06F 13/16* (2006.01)

(52) U.S. Cl.
CPC .......... *G06F 13/1668* (2013.01); *Y02D 10/00* (2018.01)

(58) Field of Classification Search
CPC .......................... G06F 13/1668; Y02D 10/00
See application file for complete search history.

(56) References Cited

U.S. PATENT DOCUMENTS

| 7,095,245 B2 | 8/2006 | Zumkehr et al. |
| 7,236,894 B2 | 6/2007 | Oh et al. |
| 7,515,487 B2 | 4/2009 | Seo et al. |
| 7,525,357 B2 | 4/2009 | Kuzmenka |
| 7,577,212 B2 | 8/2009 | Keeth et al. |

(Continued)

*Primary Examiner* — Nimesh G Patel
(74) *Attorney, Agent, or Firm* — Lowenstein Sasndler LLP

(57) ABSTRACT

A method of operation of a flash integrated circuit (IC) memory device is described. The flash IC memory device has an array of memory cells and an interface to receive control, address and data signals using an internal reference voltage. The method includes, at boot-up, initializing the internal reference voltage to a default voltage. At boot-up, the interface is operable to receive, using the internal reference voltage, signals having a first voltage swing at a first signaling frequency. The method includes receiving a first command that specifies calibration of the interface during a calibration mode. The calibration mode is used to calibrate the interface to operate at a second signaling frequency and receive signals having a second voltage swing. The second voltage swing is smaller than the first voltage swing and the second signaling frequency is higher than the first signaling frequency.

20 Claims, 18 Drawing Sheets

(56) References Cited

U.S. PATENT DOCUMENTS

| | | |
|---|---|---|
| 8,446,173 B1 | 5/2013 | Faucher et al. |
| 9,166,838 B1 | 10/2015 | Luo et al. |
| 9,240,784 B2 | 1/2016 | Gondi et al. |
| 9,971,521 B2 | 5/2018 | Jeon |
| 2007/0252618 A1 | 11/2007 | Gopalakrishnan et al. |
| 2009/0303802 A1 | 12/2009 | Lee |
| 2010/0226185 A1 | 9/2010 | Lee |
| 2011/0239021 A1* | 9/2011 | Vedder ................ G06F 1/3203 713/323 |
| 2011/0283060 A1 | 11/2011 | Ware et al. |
| 2012/0221769 A1 | 8/2012 | Ware et al. |
| 2012/0250433 A1* | 10/2012 | Jeon ................ G11C 11/4082 365/230.08 |
| 2013/0120020 A1 | 5/2013 | Li et al. |
| 2013/0262791 A1* | 10/2013 | Henderson ........... G11C 29/023 711/E12.001 |
| 2014/0035549 A1 | 2/2014 | Hafizi et al. |
| 2014/0253179 A1 | 9/2014 | Kulkarni et al. |
| 2017/0248987 A1* | 8/2017 | Tsao ................ G06F 13/1689 |

\* cited by examiner

Vref Calibration Protocol with internal Vref generation

FLASH MEMORY DEVICE HAVING A CALIBRATION MODE

RELATED APPLICATIONS

This application is a continuation of U.S. patent application Ser. No. 17/849,450, filed Jun. 24, 2022, which is a continuation of U.S. patent application Ser. No. 16/709,506, filed Dec. 10, 2019, now U.S. Pat. No. 11,372,784, which is a continuation of U.S. patent application Ser. No. 16/145,837, filed Sep. 28, 2018, now U.S. Pat. No. 10,509,741, which is a continuation of U.S. patent application Ser. No. 15/616,785, filed Jun. 7, 2017, now U.S. Pat. No. 10,089,256, which is a continuation of U.S. patent application Ser. No. 14/080,724, filed on Nov. 14, 2013, now U.S. Pat. No. 9,715,467, which claims the benefit of U.S. Provisional Application No. 61/730,018, filed Nov. 26, 2012, the entire contents of all are incorporated by reference.

BACKGROUND

Computing memory systems are generally composed of one or more dynamic random access memory (DRAM) integrated circuits, referred to herein as DRAM devices, which are connected to one or more processors. Multiple DRAM devices may be arranged on a memory module, such as a dual in-line memory module (DIMM). A DIMM includes a series of DRAM devices mounted on a printed circuit board (PCB) and are typically designed for use in personal computers, workstations, servers, or the like. There are different types of memory modules, including a load-reduced DIMM (LRDIMM) for Double Data Rate Type three (DDR3), which have been used for large-capacity servers and high-performance computing platforms. Memory capacity may be limited by the loading of the data query (DQ) bus and the request query (RQ) bus associated with the user of many DRAM devices and DIMMs. LRDIMMs may increase memory capacity by using a memory buffer (also referred to as a register). Registered memory modules have a register between the DRAM devices and the system's memory controller. For example, a fully buffered DIMM architecture introduces an advanced memory buffer (AMB) between the memory controller and the DRAM devices on the DIMM. The memory controller communicates with the AMB as if the AMB were a memory device, and the AMB communicates with the DRAM devices as if the AMB were a memory controller. The AMB can buffer data, command and address signals. With this architecture, the memory controller does not write to the DRAM devices, rather the AMB writes to the DRAM devices. This architecture introduces latency to the memory request and increases power consumption for the AMB.

BRIEF DESCRIPTION OF THE DRAWINGS

The present embodiments are illustrated by way of example, and not of limitation, in the figures of the accompanying drawings in which.

DETAILED DESCRIPTION

In typical DRAM devices, a command and address (CA) bus is usually in a high-swing mode to ensure that the CA bus is fully functional at boot-up without the need for calibration of a reference voltage (Vref). However, low-swing signaling on the CA bus would allow lower active power and re-use of design blocks, including transmitters and receivers, for both the CA bus and the data (also referred to herein as the data request (DQ) bus) if the data bus uses low-swing signaling. Typically, in low-swing, single-ended signaling, Vref calibration on the CA bus needs to be completed before commands can be issued reliably to a single-ended receiver, such as a receiver of a memory device (e.g., DRAM device). The Vref calibration command needs to be sent on the CA bus when there is no sideband register interface to the memory device. As a result, some conventional designs use high-swing receivers for both CA and DQ and others uses high-swing receivers for CA while DQ is low swing as they can be calibrated using commands decoded through the CA bus. The embodiments described herein provide dual-mode swing receivers that allow the receivers to operate in two modes, a high-swing mode and a low-swing mode. These dual-mode swing receivers can be used for the CA bus, and thus, the memory controller and the memory devices can be configured for dual-mode swing support.

The embodiments describe a method and protocol for calibrating the reference voltage of the CA bus so that it can operate with low swing during operational mode. The commands are initially sent using a high-swing mode, which is decoded to do internal calibration, which gets the receivers to operate in a low-swing mode. In one embodiment, the memory controller and the memory device boot up in high-swing, low-data rate mode for the transmitter and receiver in the command and data bus. The proposed embodiments can work for high-swing high-data rate during startup as well, which can be used to reduce or eliminate low speed startup. The memory device can receive a command in the high-swing mode to prepare for transitioning the memory device to low-swing mode. This command can be referred to as a low-swing transition command. Alternatively, the memory controller can enable internal Vref in the DRAM device and program the DRAM device to low-swing mode on DQ and CA. The memory does the preparation for calibration to the low-swing mode in high-swing mode and programs the DRAM to the low-swing mode. The memory controller switches to low-swing (e.g., high frequency mode), and toggles a single command signal to initiate actual CA Vref calibration on the memory device with low-swing input-output (I/O). This command signal may be considered a Vref calibration command. The CA is calibrated by the memory device for low-swing operation. An additional Vref calibration step may be needed for the toggled command signal.

Figure 1:
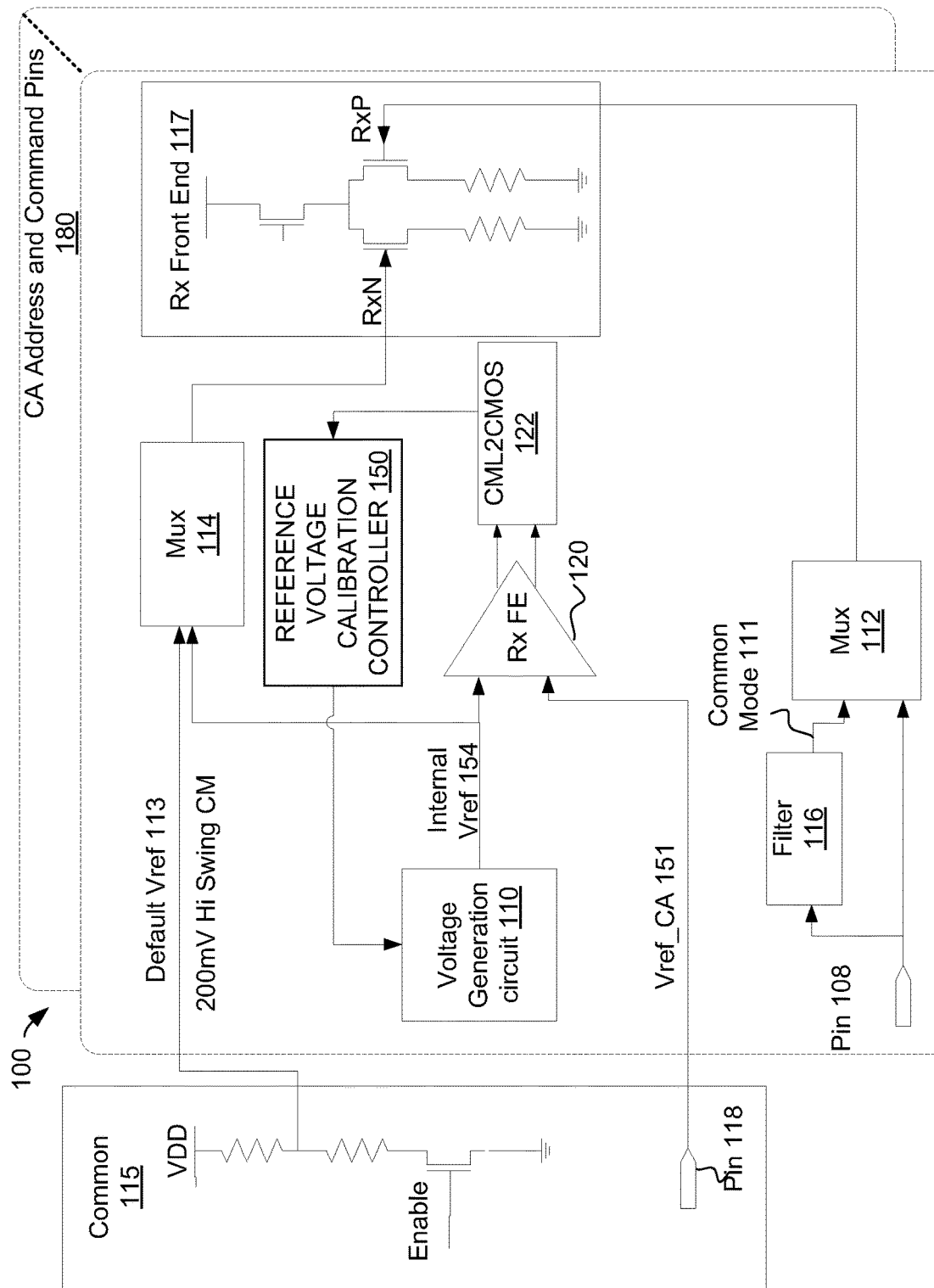
FIG. 1 is a block diagram illustrating receiver architecture with dual-mode swing support according to one embodiment.

FIG. 1 is a block diagram illustrating receiver architecture 100 with dual-mode support according to one embodiment. The receiver architecture 100 has one or more CA address and command pins 180 and a common node 115. The common node 115 includes a voltage divider and a switch to enable and disable the voltage divider. The voltage divider is to generate a default voltage reference 113 (referred to herein as default Vref). For example, the default Vref can be 200 mV for the default high-swing mode. The common node 115 also includes a pin 118 that provides an external Vref 151 (referred to as Vref_CA). Each of the one or more CA address and command pins 180 includes a voltage generation circuit 110, a reference voltage calibration controller (Vref calibration controller) 150, a preamp 120, a filter 116, a first multiplexer 112, a second multiplexer 114, a common mode logic to CMOS logic (CML2CMOS) circuit 122, a receiver front end 117 (Rx Front End). The receiver architecture 100 receives data on a pin 108. The data could be command signals, address signals, or other control signals for the CA bus. The Vref calibration controller 150 is used to calibrate the internal Vref 154, but may also be used to coordinate the transition between the high-swing and low-swing modes. In one implementation, the Vref calibration controller 150, which is used in connection with the voltage generation circuit 110, has logic that sets the internal Vref 154 generated by the voltage generation circuit 110. In one embodiment, the voltage generation circuit 110 comprises an internal Vref DAC (herein after referred to as internal DAC) to generate an internal Vref 154. In particular, the Vref calibration controller 150 may include logic that provides an offset to the internal DAC (or other type of voltage generation circuit), and the internal DAC generates the internal Vref 154 based on the offset. Alternatively, other types of voltage generation circuits than an internal DAC may be used as would be appreciated by one of ordinary skill in the art having the benefit of this disclosure. The first multiplexer 112 receives the incoming signal on the pin 108 (e.g., $CA_0$-$CA_N$, where N represents the number of pins of the CA bus). The output of the first multiplexer 112 is coupled to a first terminal of the receiver front end 117 (RxP). Using a clock pattern or any of the direct current balanced patterns at the input, an average can be calculated to get the common mode 111 using one of the following options: 1) passive filters (e.g., RC filter); 2) switched capacitor filter; and 3) low bandwidth amplifier (e.g., voltage follower). The first multiplexer 112 can be used to switch in the filter 116 during steps of the dual-mode calibration process described below with respect to FIGS. 2-3. Alternatively, the first multiplexer 112 can be other types of selection circuits as would be appreciated by one of ordinary skill in the art having the benefit of this disclosure.

Figure 9:
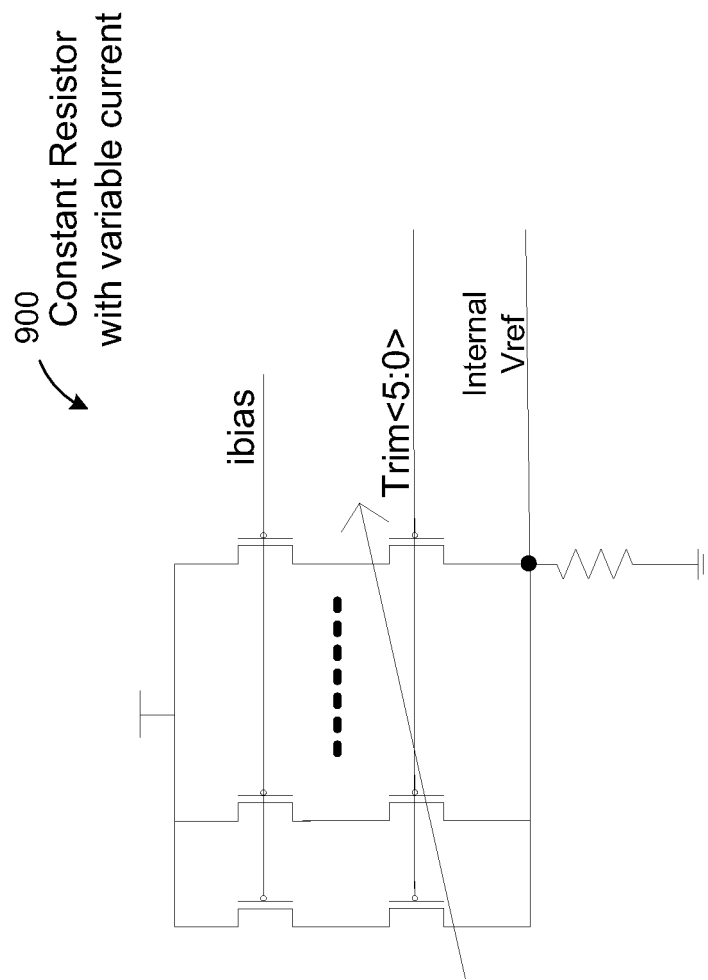
FIG. 9 is a diagram of a voltage generation circuit including a constant resistance with a variable current.
Figure 10:
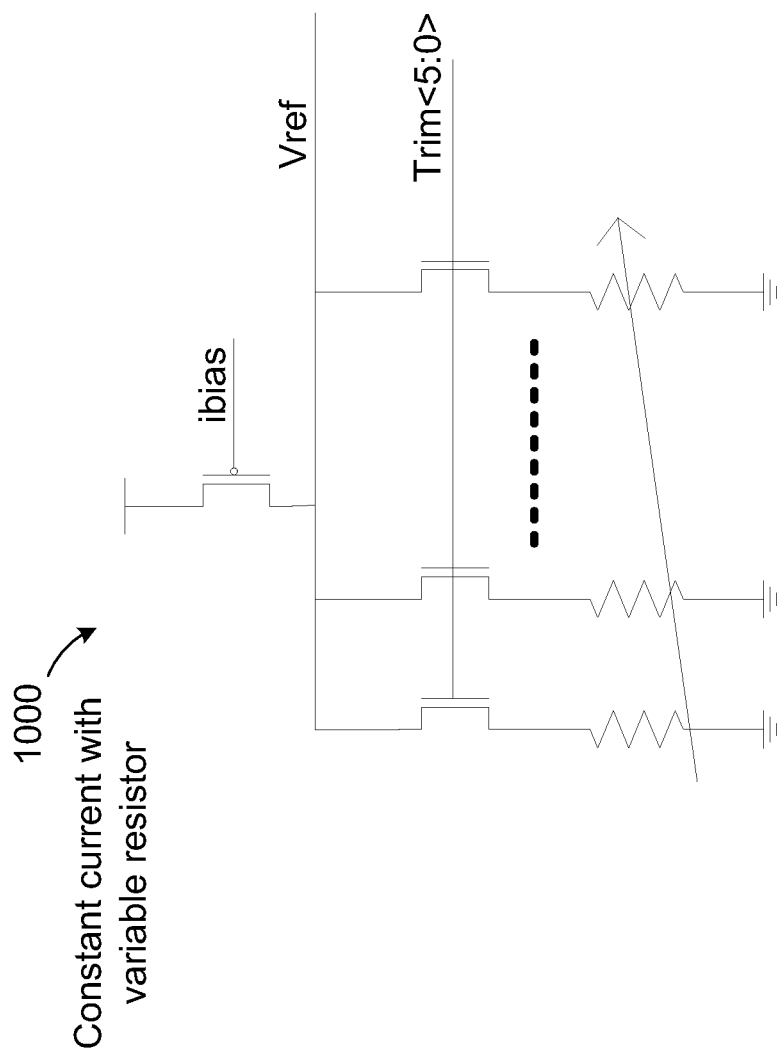
FIG. 10 is a diagram of a voltage generation circuit including a constant current and a variable resistance.
Figure 11:
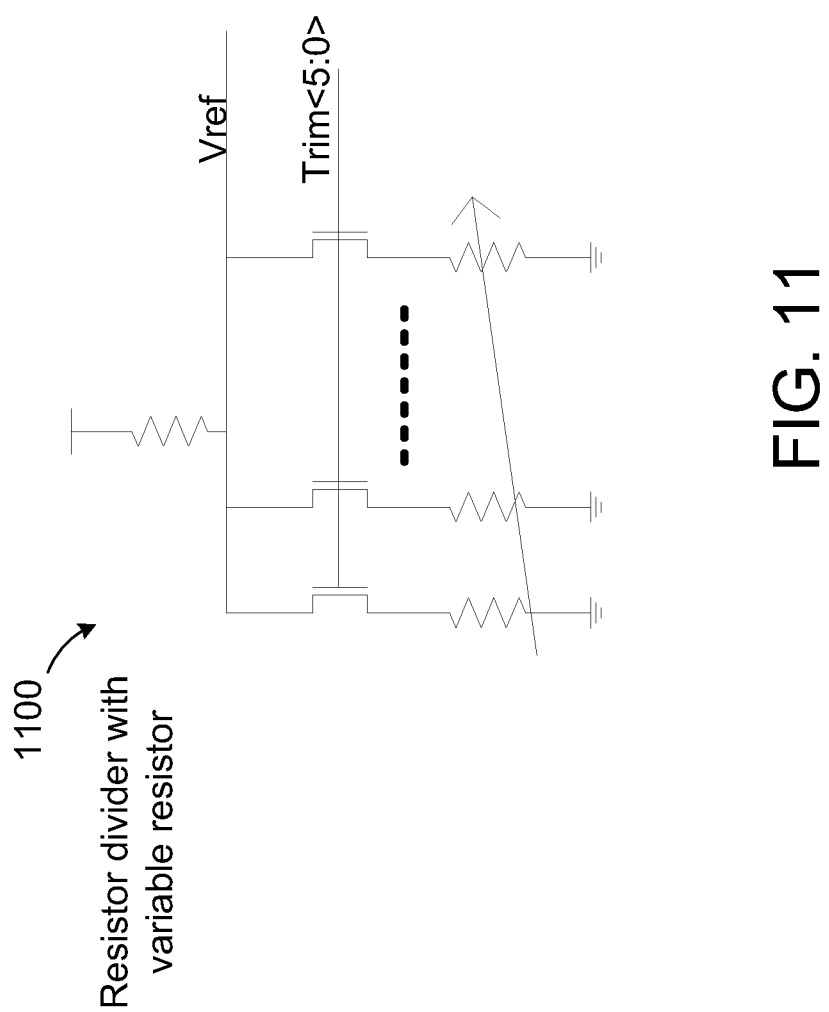
FIG. 11 is a diagram of a voltage generation circuit including a resistor divider and a variable resistance.

The preamp 120 receives the internal Vref 154 and the external Vref 151 on the pin 118. In particular, the preamp 120 can receive the internal Vref 154 during some steps of the calibration process and the external Vref 151 during different steps of the dual-mode calibration process described below with respect to FIGS. 2-3. The output of the preamp 120 is coupled to the CML2CMOS circuit 122 and the output of the CML2CMOS circuit 122 can be feedback to the logic 151 of the Vref calibration controller 150. The Vref calibration circuit 150 can control the voltage generation circuit 110 to set or calibrate the internal Vref 154. FIGS. 9-11 illustrate different embodiments of the voltage generation circuit 110.

FIG. 9 is a diagram of a voltage generation circuit 900 including a constant resistance with a variable current. The voltage generation circuit 900 includes six current sources (transistors) that are controlled by six switches, which are activated by trim signals (e.g., Trim<5:0>) received from the logic of the Vref calibration controller 150, and a resistor coupled to common ground. In other implementations, other number of current source transistors could be used. This voltage generation circuit 110 could be considered a constant resistor with variable current (as indicated by the arrow across the transistors). Also, in other implementations, other types of voltage generation circuits may be used as would be appreciated by one of ordinary skill in the art having the benefit of this disclosure. The voltage generation circuit 110 may be a circuit with constant current with variable resistance, a circuit with constant resistance with variable current, a circuit with a resistor divider with one being variable resistor, a circuit with active devices instead of resistors in any of the resistor combinations, or switched capacitance based adjustable voltage divider. In another embodiment, as illustrated in FIG. 10, a voltage generation circuit 1000 includes a constant current, as controlled by the trim signals from the Vref calibration controller, and a variable resistance (as indicated by the arrow across multiple resistors). In another embodiment, as illustrated in FIG. 11, a voltage generation circuit 1100 includes a resistor divider, as controlled by the trim signals from the Vref calibration controller, and a variable resistance (as indicated by the arrow across multiple resistors). Furthermore, there are other variations for these voltage generation circuits 110, 900, 1000, and 1100, including switching the top and bottom portions of the circuit, using PMOS or NMOS transistors, using active devices instead of passive resistors, or using any other voltage divider types as would be appreciated by one of ordinary skill in the art having the benefit of this disclosure.

A second multiplexer 114 is coupled to receive the default Vref 113, as described above, and the internal Vref 154. The output of the second multiplexer 114 is coupled to a second terminal of the receiver front end 117 (RxN). The second multiplexer 114 can be used to switch between these two reference voltages during steps of the dual-mode calibration process described below with respect to FIGS. 2-3. Alternatively, the second multiplexer 114 can be other types of selection circuits as would be appreciated by one of ordinary skill in the art having the benefit of this disclosure.

As described above, in typical DRAM devices, the CA bus is usually in a high-swing mode to ensure that the CA bus is fully functional at boot-up without the need for Vref calibration. The embodiments described herein provide low-swing signaling on the CA bus to allow lower active power and to re-use design for the DQ and CA receivers and transmitters. The embodiments described herein provide dual-mode swing receivers that allow the receivers to operate in two modes, a high-swing mode and a low-swing mode. These dual-mode swing receivers can be used for the CA bus, and thus, the memory controller and the memory devices can be configured for dual-mode swing support. The dual-mode swing support is on transmission levels at the CPHY (controller side) and MPHY (memory side). For example, the low-swing near ground signaling (NGS) is 250 mV swing at full speed, such as 1.6 Gbps single data rate (SDR) and high-swing NGS is 400 mV at boot frequency (slower than full speed). NGS is a single-ended, ground-terminated signaling technology that enables high data rates at significantly reduced input output (IO) signaling power and design complexity, while maintaining excellent signal integrity. For example, NGS enables high performance single-ended signaling by lowering the operating voltage to 0.5V and maintaining robust signal integrity at near ground levels. NGS may also decrease active IO power consumption by lowering the signal swing and terminating to ground. The lower IO voltage may be better matched to the operating voltage of advanced CPU's and GPU's and reduce the cost and complexity of integrating the memory controller on the processor chip.

The embodiments describe a method and protocol for calibrating the reference voltage of the CA bus so that it can operate with low swing during operational mode. As described above, the commands are initially sent using a high-swing mode, which is decoded to do internal calibration, which gets the receivers to operate in a low-swing mode, as described in more detail with respect to FIGS. 2-3.

Figure 2:
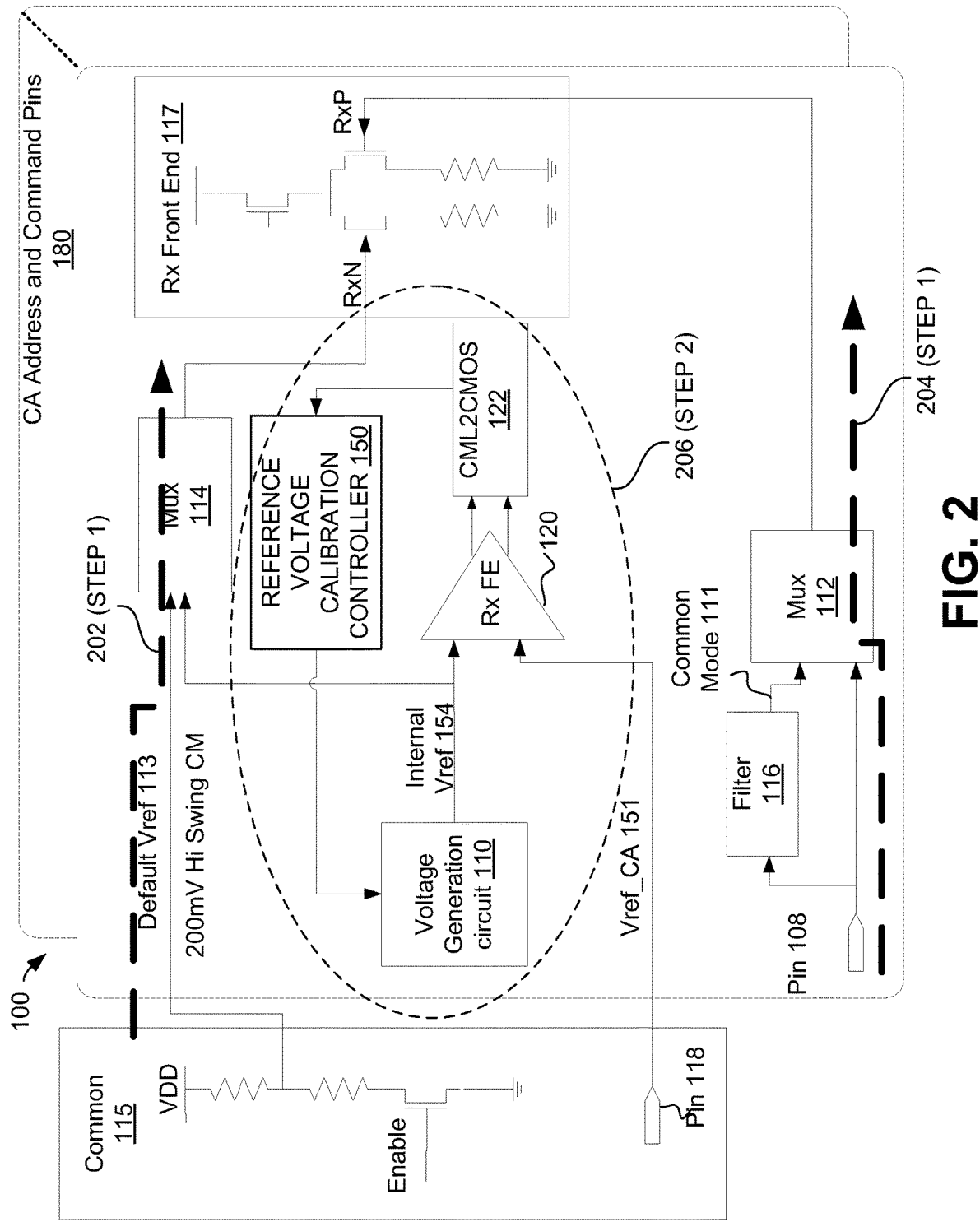
FIG. 2 is a block diagram illustrating the receiver architecture of FIG. 1 during a transition from a high-swing mode to a low-swing mode according to one embodiment.

FIG. 2 is a block diagram illustrating the receiver architecture 100 of FIG. 1 during a transition from a high-swing mode to a low-swing mode according to one embodiment. The single-ended transmitter and receiver of the CA bus boot up in a high-swing mode. In particular, the second multiplexer 114 receives a default Vref 113 from the common node 115 in a step 202 (step 1). In the depicted embodiment, an internal resistor divider from Vdd generates the default Vref 113 to be used in the high-swing mode. In one implementation, the default Vref 113 is 200 mV reference. Of course, other reference voltages may be used for the high-swing mode based on the design of the receiver architecture 100.

While in the high-swing mode, the first multiplexer 112 receive a first command (e.g., a low-swing transition command) to transition the receiver to a low-swing mode on the pin 108 in step 204 (step 1). The first low-swing transition command is received from the single-ended transmitter on the pin 108. The receiver decodes the first command, which calibrates per pin, including determining an offset for the voltage generation circuit 110, which generates the internal Vref 154 and determining the low-swing Vref at step 206 (step 2). One implementation combines both offset and low-swing Vref calibration in a single step, step 2. Alternatively, these could be separate steps. In step 2, the preamp 120 receives the external Vref 151 on the pin 118, as well as the internal Vref 154. The Vref calibration controller 150 gets feedback from the CML2CMOS 122 and determines the offset (e.g., offset for an internal DAC of the reference voltage calibration) that is used to set or adjust the internal Vref 154 generated by the voltage generation circuit 110 (e.g., internal DAC). It should be noted that during step 1 (illustrated in FIG. 2), the second multiplexer 114 selects the default Vref 113 received from the common node 115. As described below at step 2, the second multiplexer 114 selects an internal Vref 154. By calibrating the offset and the low-swing Vref, the receiver can be programmed to low-swing internal Vref mode. The dual-mode calibration process continues as described below with respect to FIG. 3.

Figure 3:
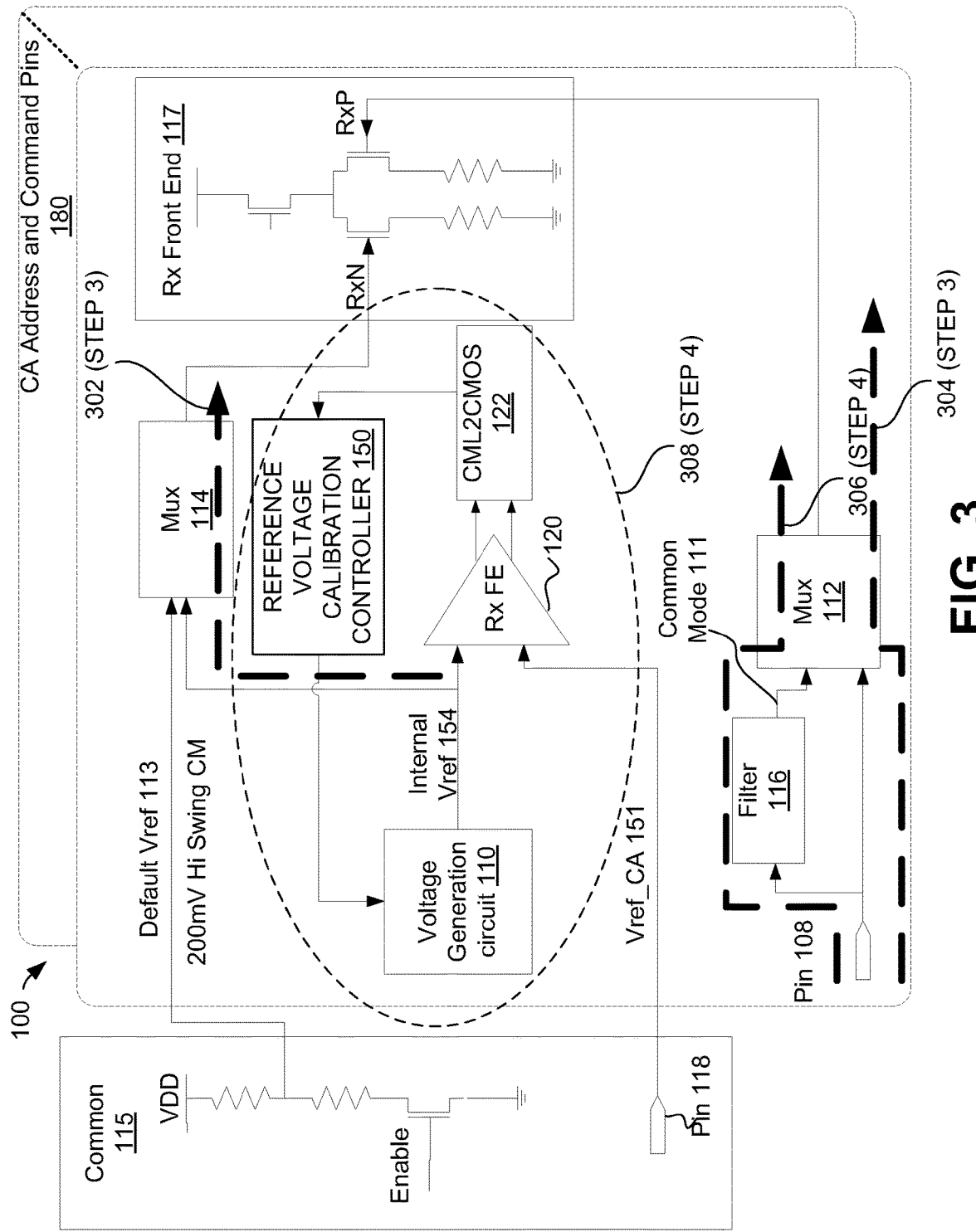
FIG. 3 is a block diagram illustrating the receiver architecture of FIG. 1 during the transition from a high-swing mode to a low-swing mode according to one embodiment.

FIG. 3 is a block diagram illustrating the receiver architecture 100 of FIG. 1 during the transition from a high-swing mode to a low-swing mode according to one embodiment. The single-ended transmitter toggles a single command signal, a second calibration command, on the pin 108 to switch the receiver to low-swing (e.g., high frequency mode) in step 304 (step 3). The receiver decodes the second command (e.g., Vref calibration command), which initiates the CA Vref calibration of the receiver for low-swing input-output (I/O). During step 3, the second multiplexer 114 selects the internal Vref 154 for the second command signal. The internal Vref 154 may be 125 mV reference, instead of 200 mV default Vref 113. In response to the second Vref calibration command, the receiver calibrates the internal Vref 154 to be per-pin dependent at steps 306 and 308. At step 306 (step 4), a clock pattern or any of the direct current balanced patterns (calibration pattern) can be received at pin 108 from the single-ended transmitter. The filter 116 can calculate an average to get the common mode 111 using one of the following options: 1) passive filters (e.g., RC filter); 2) switched capacitor filter; and 3) low bandwidth amplifier (e.g., voltage follower). At step 308 (step 4), the preamp 120 receives the external Vref 151 on the pin 118 and the internal Vref 154 from the voltage generation circuit 110. The output of the preamp 120 is coupled to the CML2CMOS circuit 122 and the output of the CML2CMOS circuit 122 can be feedback to the Vref calibration controller 150. Using the external Vref 151, the receiver architecture 100 can calibrate the internal Vref 154 to a specified voltage (e.g., 125 mV). In one implementation during step 308, the Vref calibration controller 150 includes logic that sets an offset of an internal DAC of the voltage generation circuit 110 to set the internal Vref 154. Alternatively, other voltage generation circuits than the internal DAC can be used to generate the internal Vref 154, as controlled by the logic of the Vref calibration controller 150. An offset value for the voltage-temperature (VT) drift in the internal Vref 154 is compensated for during calibration by the Vref calibration controller 150. The Vref calibration controller 150 applies the offset value to the voltage generation circuit 110 (e.g., internal DAC) to set the internal Vref 154.

It should be noted that an additional Vref calibration step could be done for the toggled command signal (the second Vref calibration command signal). It should also be noted that the single-ended transmitter and receiver of the CA bus boot up in a high-swing, low data rate mode, and transition to a low-sing, high data rate mode. Other implementations can use high-swing, high-data rate modes during startup, which can be used to reduce or eliminate low speed startup. Described below with respect to FIGS. 15-18, in one embodiment, the receiver architecture can transition a high-swing mode to a low-swing mode in four steps.

Figure 4:
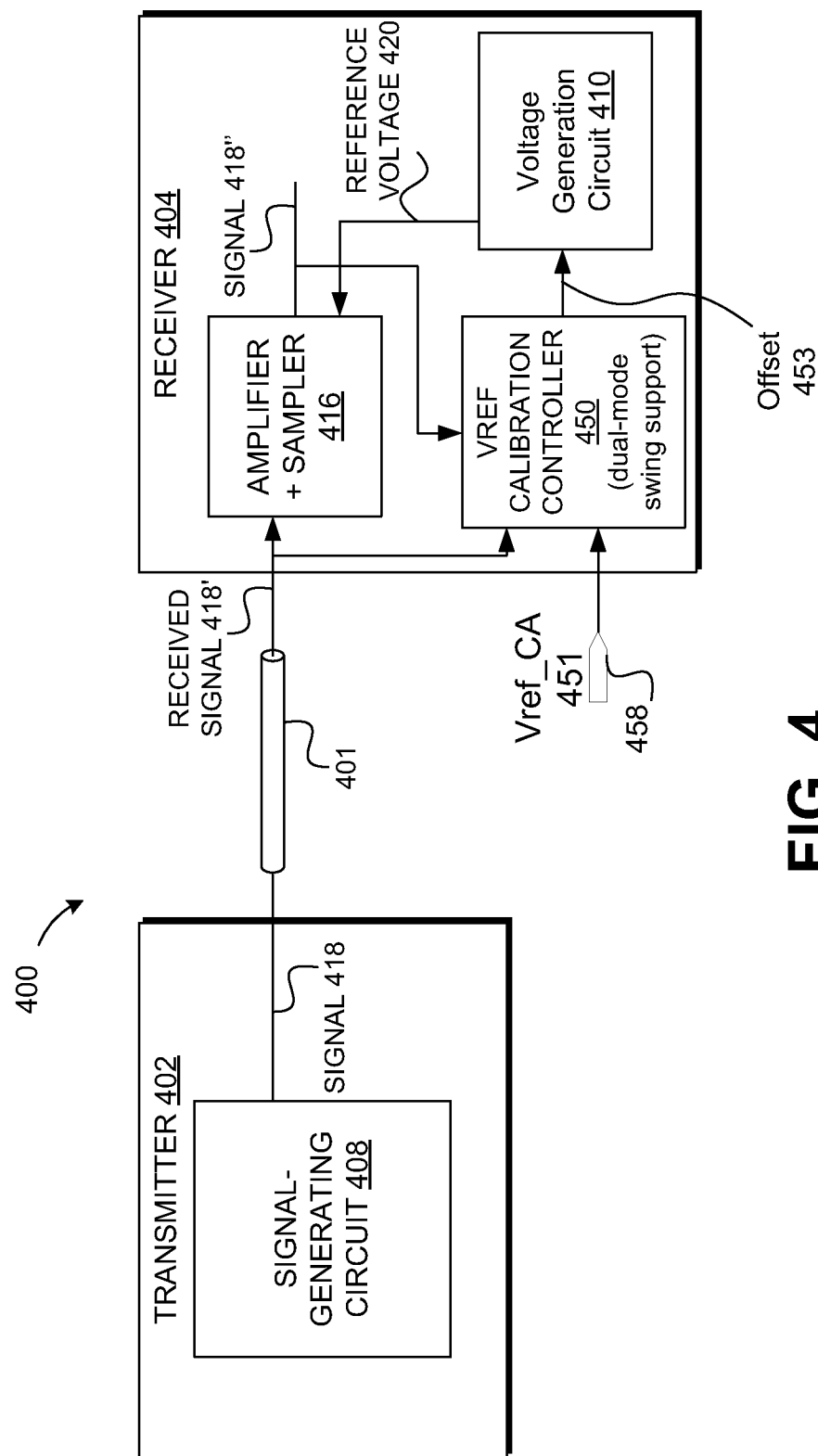
FIG. 4 is a high-level block diagram illustrating a single-ended communication system that uses a transmitter and a receiver with dual-mode swing support according to another embodiment.

FIG. 4 is a high-level block diagram illustrating a single-ended communication system 400 that uses a transmitter 402 and a receiver 404 with dual-mode swing support according to another embodiment. As illustrated in FIG. 4, communication system 400 includes a transmitter 402 (such as a memory controller), a receiver 404 (such as a memory device), and an interface 401 coupled between transmitter 402 and receiver 404. The interface 401 includes a signal channel. The transmitter 402 can further include a signal-generating circuit 408, while receiver 404 can further include an amplifier/sampler 416, a Vref calibration controller 450 and a voltage generation circuit 410.

During data signal on communication system 400, signal-generating circuit 408 in transmitter 402 generates a signal 418, which is then transmitted over the signal channel. Signal 418 is received by the receiver 404 as received signal 418'. In particular implementations, signal 418 (and hence signal 418') is a single-ended voltage signal, which is referenced to a ground level. For example, this ground level can be a ground node of a power supply, Vss. To recover the original signal 418 on receiver 404, signal 418' is compared against a reference voltage 420 generated by the voltage generation circuit 410, and the difference between the two signals is sampled by amplifier/sampler 416. The voltage generation circuit 410 may be any of the voltage generation circuits described herein. In some implementations, both signal 418' and reference voltage 420 are referenced to a ground node of a power supply, Vss'. Ideally, amplifier/sampler 416 outputs signal 418", which is a copy of signal 418. Of course, the actual signal 418" may be affected by noise. The receiver 404 may include other circuits to compensate for the noise level. The receiver 404 further includes circuitries for initializing and calibrating the amplifier/sampler 416, such as the Vref calibration controller 450. Moreover, although only a single signal 418 is shown being transmitted from transmitter 402 to receiver 404, in many cases there may be multiple signals transmitted from transmitter 402 to receiver 404, and communication system 400 may have multiple amplifiers/samplers for handing such multiple signals. Additionally, one or more signals may be transmitted from receiver 404 to transmitter 402. Also, the transmitter 402 can send the signal 418 to more than one receiver.

Transmitter 402 and receiver 404 may be located on the same integrated circuit, or they can be located on different integrated circuits. In other implementations, transmitter 402 and receiver 404 may be located on separate modules (e.g., separate cards) coupled by one or more buses.

Note that signal 418 may be a digital or analog signal, or any general signal capable of communicating information. In some implementations, signal 418 is a digital signal associated with memory operations. In these implementations, signal 418 can include read/write data, a control signal, an address signal and a clock signal. In specific implementations, this digital signal is a binary signal comprising 1's and 0's.

The Vref calibration controller 450 may be any of the Vref calibration controllers as described herein. The Vref calibration controller 450 receives an external Vref 451, such as on a pin 458. The Vref calibration controller 450 can control transitioning the receiver 404 between the high-swing mode and the low-swing mode, as well as control calibration of the voltage generation circuit 410, which generates the reference voltage 420. The result of the Vref comparison 418" (shown to happen in the RX front end 117) is also fed back to the Vref calibration controller 450.

In one implementation, the voltage generation circuits 410 includes a constant resistor with variable current as illustrated in the voltage generation circuit 900 of FIG. 9. In other implementations, the voltage generation circuits 410 may include the other types of voltage generation circuits described with respect to FIGS. 10 and 11.

Figure 5:
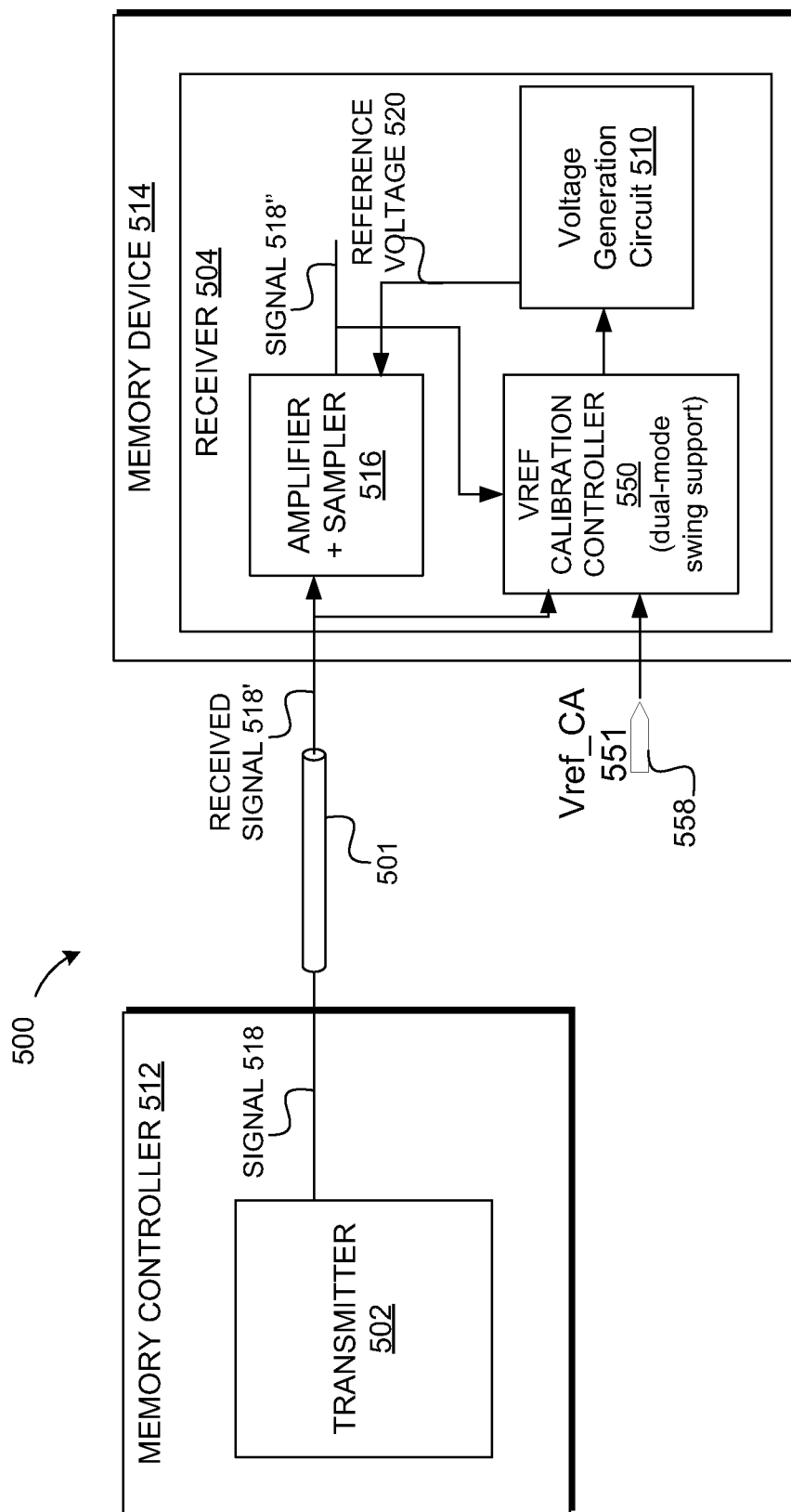
FIG. 5 is a high-level block diagram illustrating a single-ended memory system including a memory controller and a DRAM device with dual-mode swing support according to another embodiment.

FIG. 5 is a high-level block diagram illustrating a single-ended memory system 500 including a memory controller 512 and a DRAM device 514 with dual-mode swing support according to another embodiment. The memory controller 512 includes transmitter 502 and the memory device 514 includes receiver 504. In some implementations, memory device 514 is a DRAM device. However, memory device 514 can include other types of memory devices. The transmitter 502 and receiver 504 are similar to the transmitter 402 and receiver 404 described with respect to FIG. 4. The transmitter 502 sends a signal 518 over the signal channel of the interface 501, and the receiver 504 receives the signal as the received signal 518'. The receiver 504 includes the amplifier/sampler 516, the voltage generation circuit 510 and the Vref calibration controller 550 that includes logic to set the Vref generated by the voltage generation circuit 510. These components are similar to those described with respect to FIG. 4. In particular, the Vref calibration controller 550 may be any of the Vref calibration controllers as described herein. The Vref calibration controller 550 receives an external Vref 551, such as on a pin 558. The Vref calibration controller 550 can control transitioning the receiver 504 between the high-swing mode and the low-swing mode, as well as control calibration of the internal reference voltage 520, generated by voltage generation circuit 510. The result of the Vref comparison 518" (shown to happen in the RX front end 117) is also fed back to the Vref calibration controller 550.

In one implementation, the voltage generation circuits 510 includes a constant resistor with variable current as illustrated in the voltage generation circuit 900 of FIG. 9. In other implementations, the voltage generation circuits 510 may include the other types of voltage generation circuits described with respect to FIGS. 10 and 11.

In one implementation, the transmitter 502 is on a first integrated circuit and the receiver 504 is on a second integrated circuit. The first integrated circuit may include a host computer (e.g., CPU having one or more processing cores, L1 caches, L2 caches, or the like), a host controller or other types of processing devices. The second integrated circuit may include a memory device coupled to the host device, and whose primary functionality is dependent upon the host device, and can therefore be considered as expanding the host device's capabilities, while not forming part of the host device's core architecture. The memory device may be capable of communicating with the host device via a DQ bus and a CA bus. For example, the memory device may be a single chip or a multi-chip module including any combination of single chip devices on a common integrated circuit substrate. The components of FIG. 5 can reside on "a common carrier substrate," such as, for example, an integrated circuit ("IC") die substrate, a multi-chip module substrate or the like. Alternatively, the memory device may reside on one or more printed circuit boards, such as, for example, a mother board, a daughter board or other type of circuit card. In other implementations, the main memory and processor can reside on the same or different carrier substrates.

Figure 6:
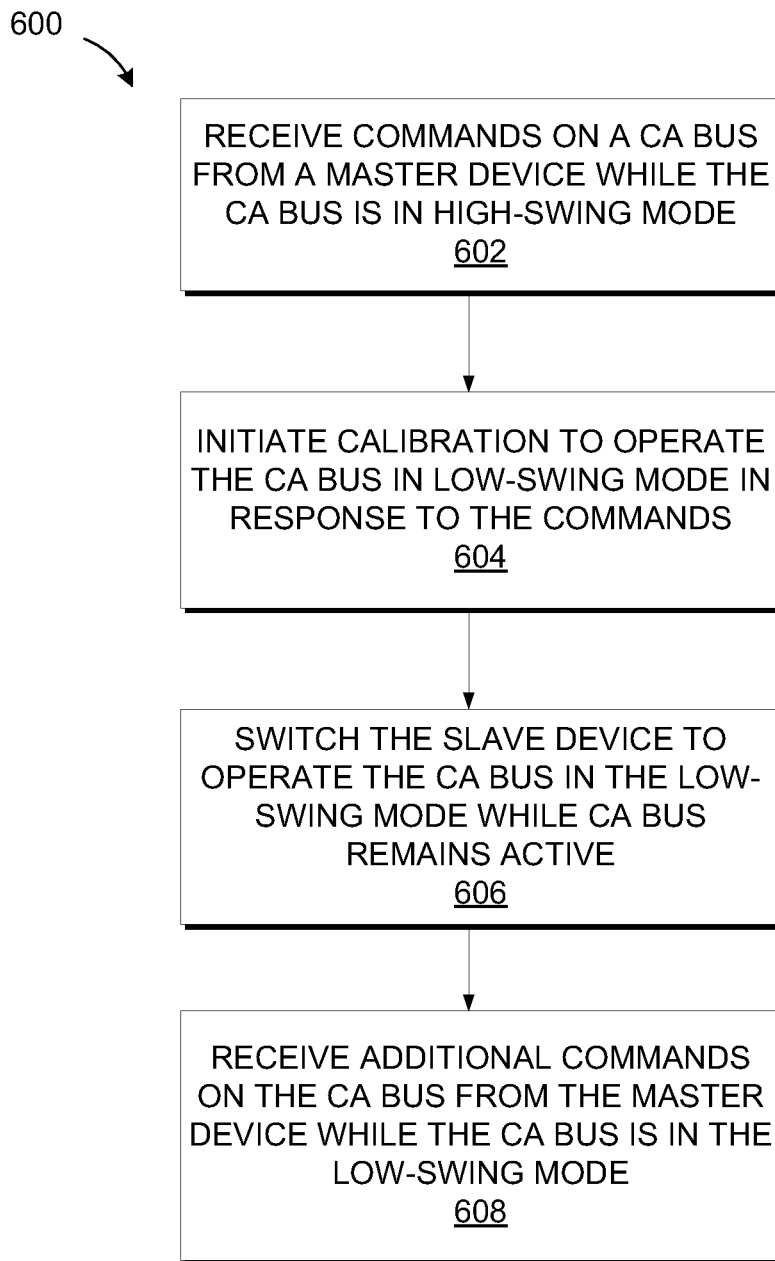
FIG. 6 is a flow diagram of a method of operating a device including a receiver with dual-mode swing support according to an embodiment.

FIG. 6 is a flow diagram of a method 600 of operating a slave device including a receiver with dual-mode swing support according to an embodiment. The method 600 begins the slave device receiving commands on a CA bus from a master device while the CA bus is in a high-swing mode (block 602). The slave device initiates calibrations to operate the CA bus in a low-swing mode in response to the commands (block 604). The slave device switches to operate the CA bus in the low-swing mode while the CA bus remains active (block 606). The slave device receives additional commands on the CA bus from the master device while the CA bus is in the low-swing mode (block 608).

In a further implementation, the method begins by booting up a DRAM device in a high-swing mode of operation. The DRAM device includes a receiver, a CA bus and a DQ bus. The DRAM device receives a first command (e.g., low-swing transition command) from a memory controller on the CA bus to transition the CA bus to a low-swing mode of operation, and the DRAM device transitions the CA bus to the low-swing mode in response to the first command. While in the low-swing mode, the DRAM device receives a second command (e.g., Vref calibration command) from the memory controller to initiate calibration of a Vref of the CA bus, and the DRAM device calibrates the Vref of the CA bus by the DRAM device. In a further implementation, the DRAM device operates the DQ bus in the low-swing mode of operation.

As part of booting up, the DRAM device can operate the CA bus in a default startup condition using a default Vref. The default Vref is greater than the Vref for the low-swing mode. The default Vref may be generated using a resister divider and a voltage supply (e.g., Vdd). In a further embodiment, the DRAM decodes a first calibration command to calibrate an initial offset and an initial Vref for the CA bus in the low-swing mode and decodes a second calibration command to disable command decoding and to initiate calibrating the Vref. The Vref calibration can optionally be done on a per-pin basis for the CA bus.

In some implementations, the DRAM device can boot up in the high-swing, low-data rate mode on the CA bus. The DRAM device can then transition the CA bus to the low-swing, high-data rate mode.

In another implementation, a method begins by receiving commands on a CA bus at a slave device from a master device while the CA bus is in a high-swing mode, such as at startup of the slave device. The slave device and the master device each include dual-mode input-output (I/O) support to operate the CA bus in a low-swing mode and the high-swing mode. The commands received from the master device initiate calibration of the slave device to operate the CA bus in the low-swing mode. The slave device switches to operate the CA bus in the low-swing mode while the CA bus remains active and then receives additional commands on the CA bus at the slave device from the master device while the CA bus is in the low-swing mode.

As described herein, the master device may be a memory controller and the slave device a memory device, such as a DRAM device.

Figure 7:
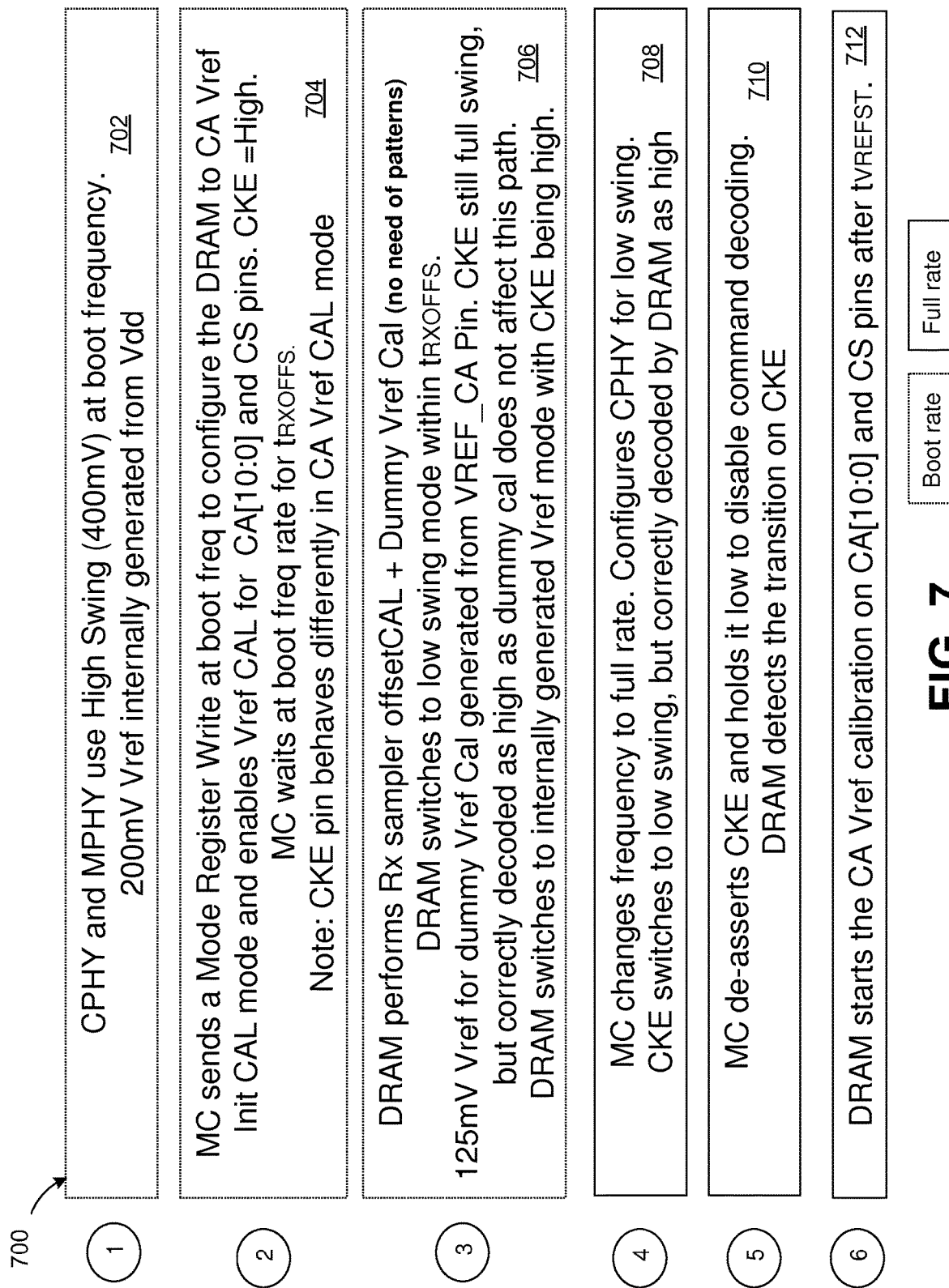
FIG. 7 is a flow diagram of a method of operating a DRAM and a memory controller according to another embodiment.
Figure 8:
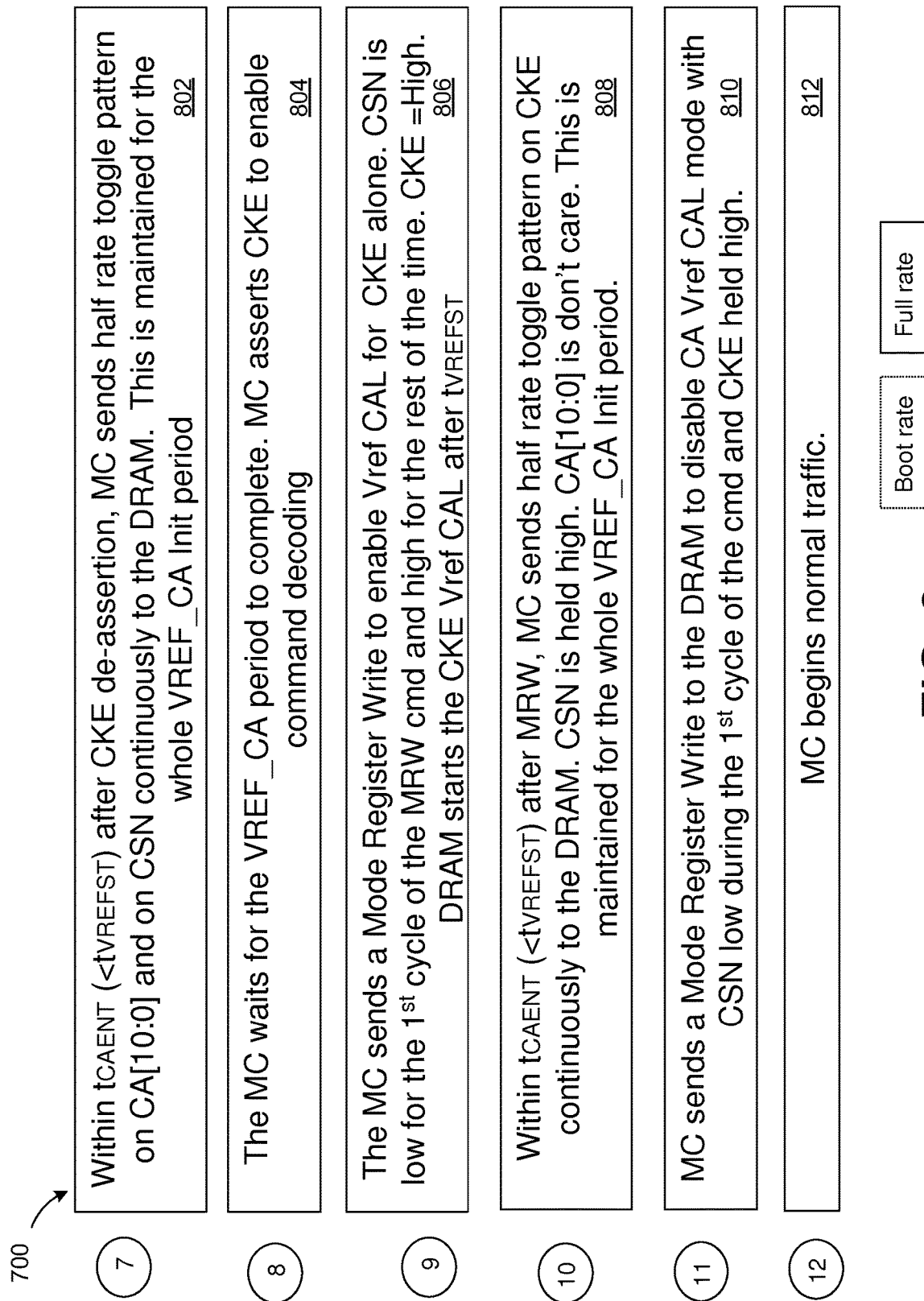
FIG. 8 is a flow diagram of the method of operating a DRAM and a memory controller according to another embodiment.

FIGS. 7-8 illustrate a flow diagram of a method of operating a DRAM and a memory controller according to another embodiment. Referring to FIG. 7, the method 700 begins by the memory controller (CPHY) and the DRAM (MPHY) transmission levels use a high-swing Vref (e.g., 400 mV) at a boot frequency and an internal Vref (e.g., 200 mV), which is internally generated from Vdd (block 702). At block 704, the memory controller (MC) sends a mode register write (a first command) at the boot frequency to configure the DRAM device to CA Vref initial calibration mode (first mode) and enables Vref calibration for the CA bus (e.g., CA[10:0]) and chip-select (CS) pins. In one embodiment, the boot rate may be between 10 MHz to 55 MHz and the full rate may be between 166 MHz to 1600 MHz based on various settings. Alternatively, other boot rates and full rates may be used as would be appreciated by one of ordinary skill in the art having the benefit of this disclosure. Also at block 704, the clock enable signal is set high (CKE=High), and the memory controller waits at the boot frequency for a specific amount of time ($t_{RXOFFS}$) before sending a mode register command (e.g., mode register write (MRW) command) to switch the DRAM device to low-swing mode. It should be noted that CKE pin behaves differently in CA Vref calibration mode (second mode). At block 706, the DRAM performs receiver sampler offset calibration (Rx sampler offsetCAL) and Vref calibration. The Vref calibration may be done using various techniques as would be appreciated by one of ordinary skill in the art having the benefit of this disclosure. Also, at block 706, the DRAM device switches to low-swing mode within the same amount of time referenced above, $t_{RXOFFS}$. The 125 mV Vref for the Vref can be generated from the external Vref pin, and CKE is still full swing, but correctly decoded as high as the calibration does not affect this path. Also, at block 706, the DRAM device switches to the internal Vref mode with CKE being high. Blocks 702-706 can be performed at the boot rate as depicted as blocks with dotted borders. In other implementations, one or more of the blocks 706-706 can be performed at a full rate as illustrated in blocks 708-712 of FIG. 7 and blocks 802-812 of FIG. 8. Blocks performed at the full rate are depicted as blocks with solid borders.

At block 708, the memory controller changes the frequency to a full rate. As described above, the full rate may be between 166 MHz to 1600 MHz based on various settings. Also, at block 708, the memory controller is configured for low-swing mode, and the CKE switches to low-swing mode, but is correctly decoded by the DRAM device as being high. At block 710, the memory controller de-asserts CKE and holds it low to disable command decoding, and the DRAM device detects the transition on CKE. At block 712, the DRAM device starts the CA Vref calibration on the CA bus (e.g., CA[10:0]) and CS pins after a certain pre-determined amount of time ($t_{VREFST}$) when toggle patterns are received from the memory controller.

Referring to FIG. 8, the method 700 continues by the memory controller sending a half-rate toggle pattern on the CA bus (e.g., CA[10:0]) and on CSN (chip select not (or chip select bar)) continuously to the DRAM device within a specified time (e.g., within $t_{CAENT}$, which is less than $t_{VREFST}$) (block 802). $t_{CAENT}$ refers to a time interval the memory controller has to send pattern on CKE after $t_{CAENT}$ (time interval) of issuing the MRW command that triggers the calibration. This may be maintained for the whole initialization period of Vref calibration. At block 804, the memory controller waits for the initialization period to complete and asserts CKE to enable command decoding. At block 806, the memory controller sends a mode register write to enable Vref calibration for CKE alone. Also, at block 806, CSN is low for the first cycle of the mode register command and high for the rest of the time (CKE=high), and the DRAM device starts the CKE Vref calibration after $t_{VREFST}$. At block 808, the memory controller sends a half-rate toggle pattern on CKE continuously to the DRAM device within the specified time (e.g., $t_{CAENT}$) and CSN is held high and the CA bus (e.g., CA[10:0]) is set to don't care. This may be maintained for the whole initialization period. At block 810, the memory controller sends a mode register write to the DRAM device to disable CA Vref calibration mode with CSN low during the first cycle of the command and CKE is held high. At block 812, the memory controller begins normal traffic on the CA bus in the low-swing mode. It should also be noted that the internal Vref of the receivers of the CA bus is optionally calibrated on a per-pin basis.

Figure 12:
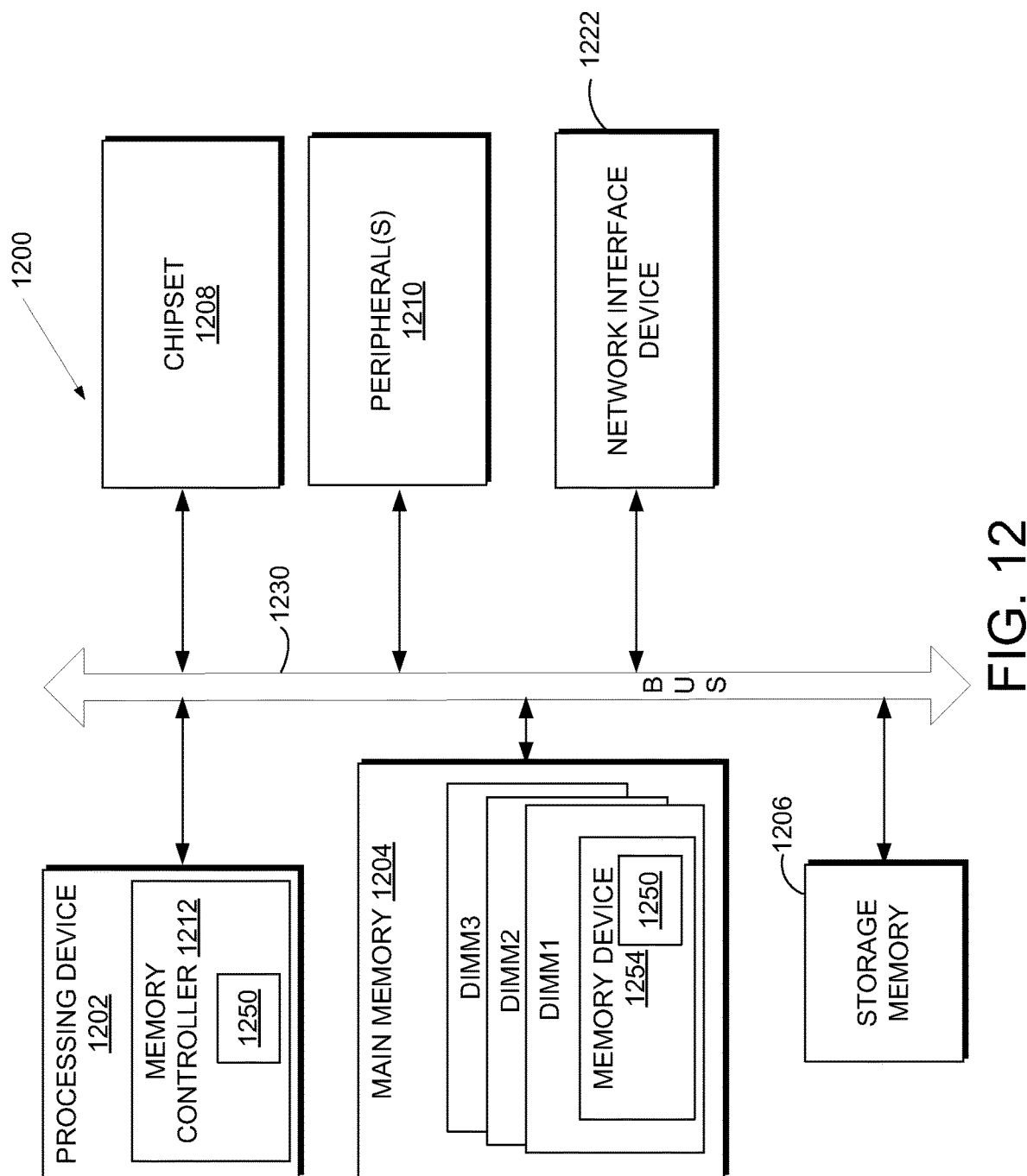
FIG. 12 is a diagram of a computer system, including main memory with dual-mode swing support according to one embodiment.

FIG. 12 is a diagram of a computer system 1200, including main memory 1204 with dual-mode swing support according to one embodiment. The computer system 1200 may be connected (e.g., networked) to other machines in a LAN, an intranet, an extranet, or the Internet. The computer system 1200 can be a host in a cloud, a cloud provider system, a cloud controller, a server, a client, or any other machine. The computer system 1200 can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM), a storage memory 1206 (e.g., flash memory, static random access memory (SRAM), etc.), and a secondary memory 1218 (e.g., a data storage device in the form of a drive unit, which may include fixed or removable computer-readable storage medium), which communicate with each other via a bus 1230. The main memory 1204 includes the receiver architectures 100, 400, 500 as described above with respect to FIGS. 1-5, as described in more detail below.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. Processing device 1202 includes a memory controller 1212 as described above. The memory controller 1212 is a digital circuit that manages the flow of data going to and from the main memory 1204. The memory controller 1212 can be a separate integrated circuit, but can also be implemented on the die of a microprocessor. The memory controller 1212 may include the single-ended receiver architectures 1250 as described above with respect to FIGS. 1-5 as described above. In addition, or in the alternative, the single-ended receiver architectures 1250 may also reside in the memory device 1254.

The computer system 1200 may include a chipset 1208, which refers to a group of integrated circuits, or chips, that are designed to work with the processing device 1202 and controls communications between the processing device 1202 and external devices. For example, the chipset 1208 may be a set of chips on a motherboard that links the processing device 1202 to very high-speed devices, such as main memory 1204 and graphic controllers, as well as linking the processing device to lower-speed peripheral buses of peripherals 1210, such as USB, PCI or ISA buses.

The computer system 1200 may further include a network interface device 1222. The computer system 1200 also may include a video display unit (e.g., a liquid crystal display (LCD)) connected to the computer system through a graphics port and graphics chipset, an alphanumeric input device (e.g., a keyboard), a cursor control device (e.g., a mouse), and a signal generation device 1220 (e.g., a speaker).

Figure 13:
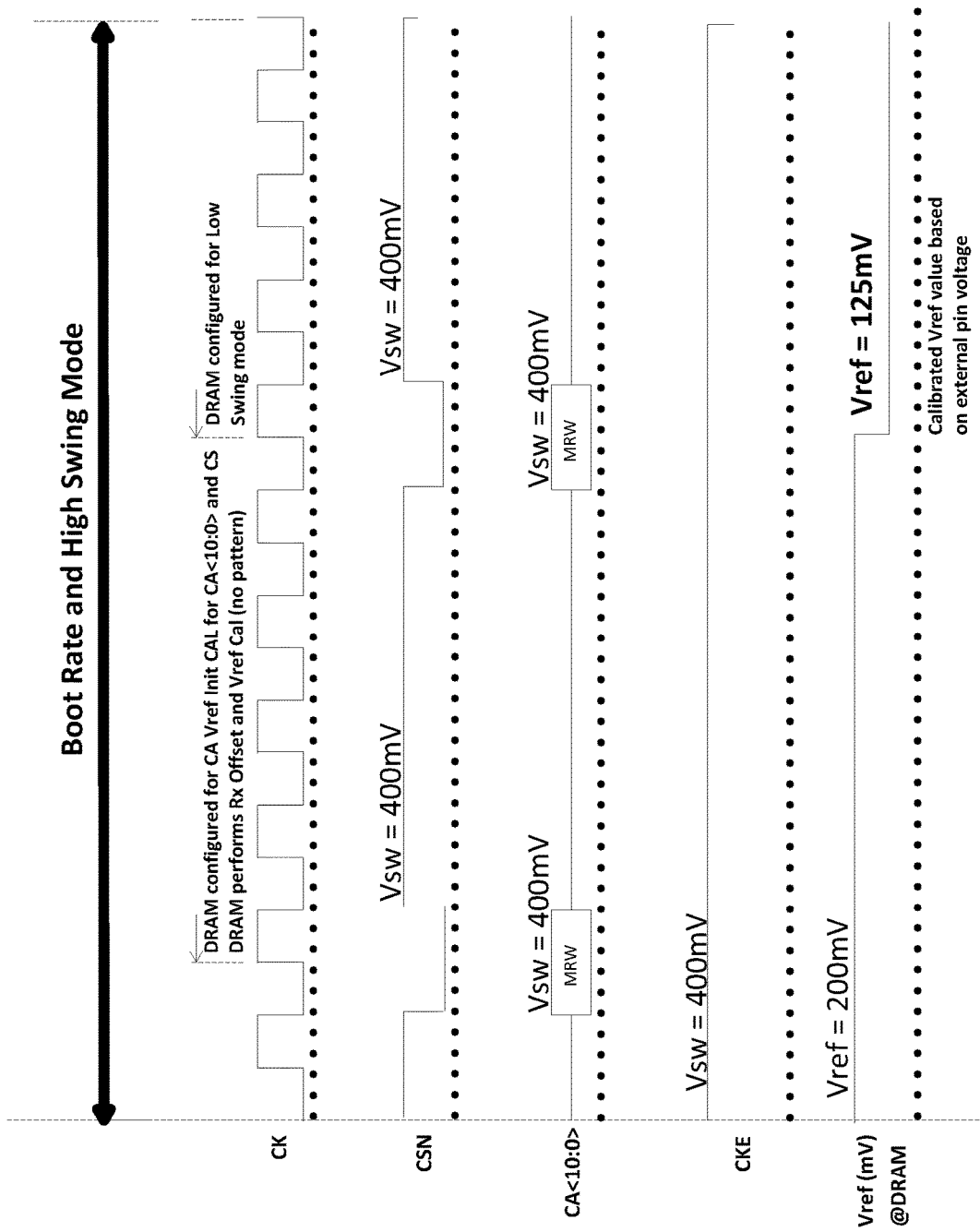
FIG. 13 is a timing diagram of the receiver architecture with dual-mode swing support in a high-swing mode before transition to a low-swing mode according to one embodiment.

FIG. 13 is a timing diagram of the receiver architecture with dual-mode swing support in a high-swing mode before transition to a low-swing mode according to one embodiment. The timing diagram of FIG. 13 includes signals for CK, CSN, CA<10:0>, CKE, and Vref (mV) at the DRAM device. The high-swing mode can operate at a boot rate before transition to the low-swing mode.

Figure 14:
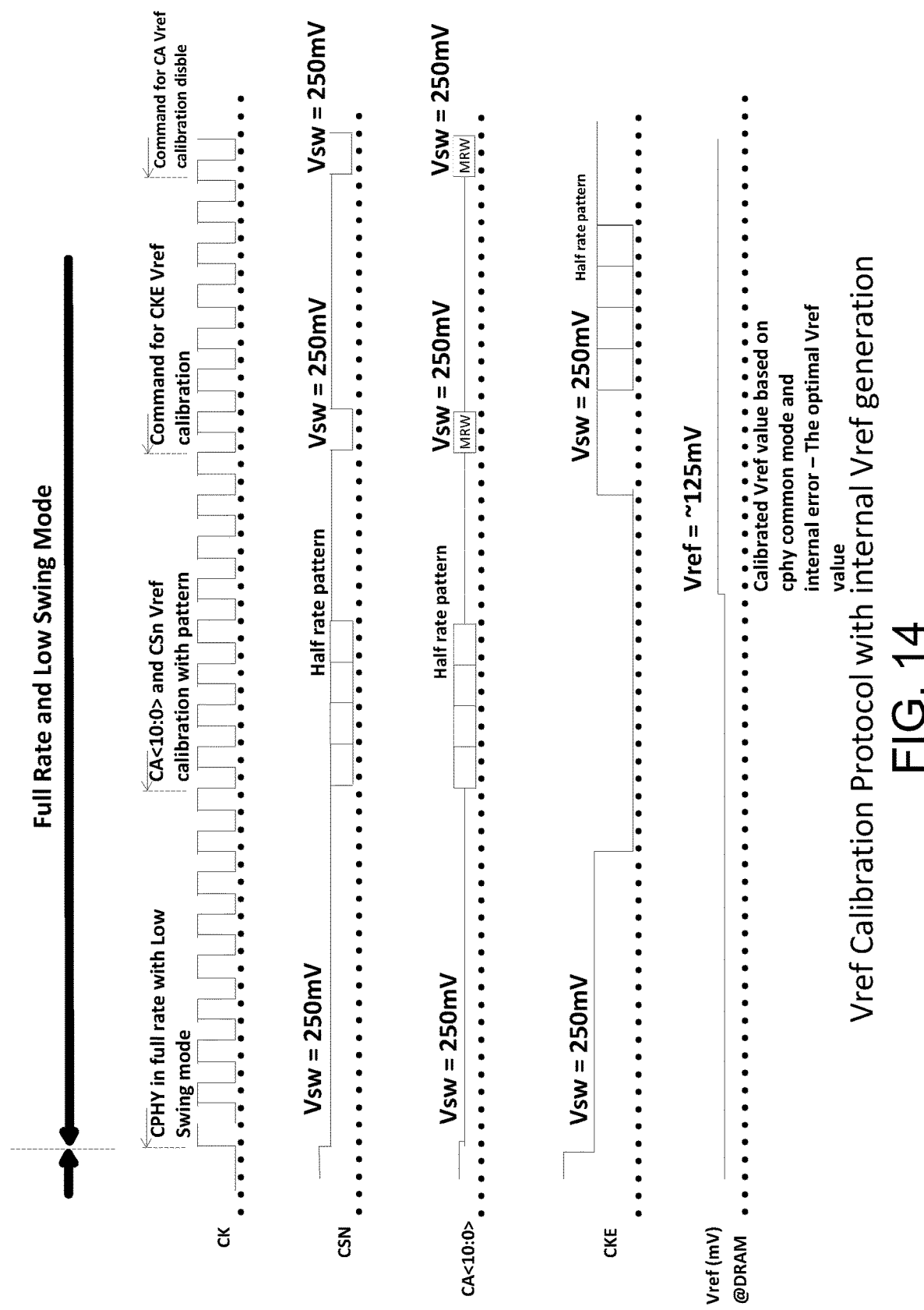
FIG. 14 is a timing diagram of the receiver architecture with dual-mode swing support in a low-swing mode after transition from a high-swing mode according to one embodiment.

FIG. 14 is a timing diagram of the receiver architecture with dual-mode swing support in a low-swing mode after transition from a high-swing mode according to one embodiment. The low-swing mode can operate at full rate.

Figure 15:
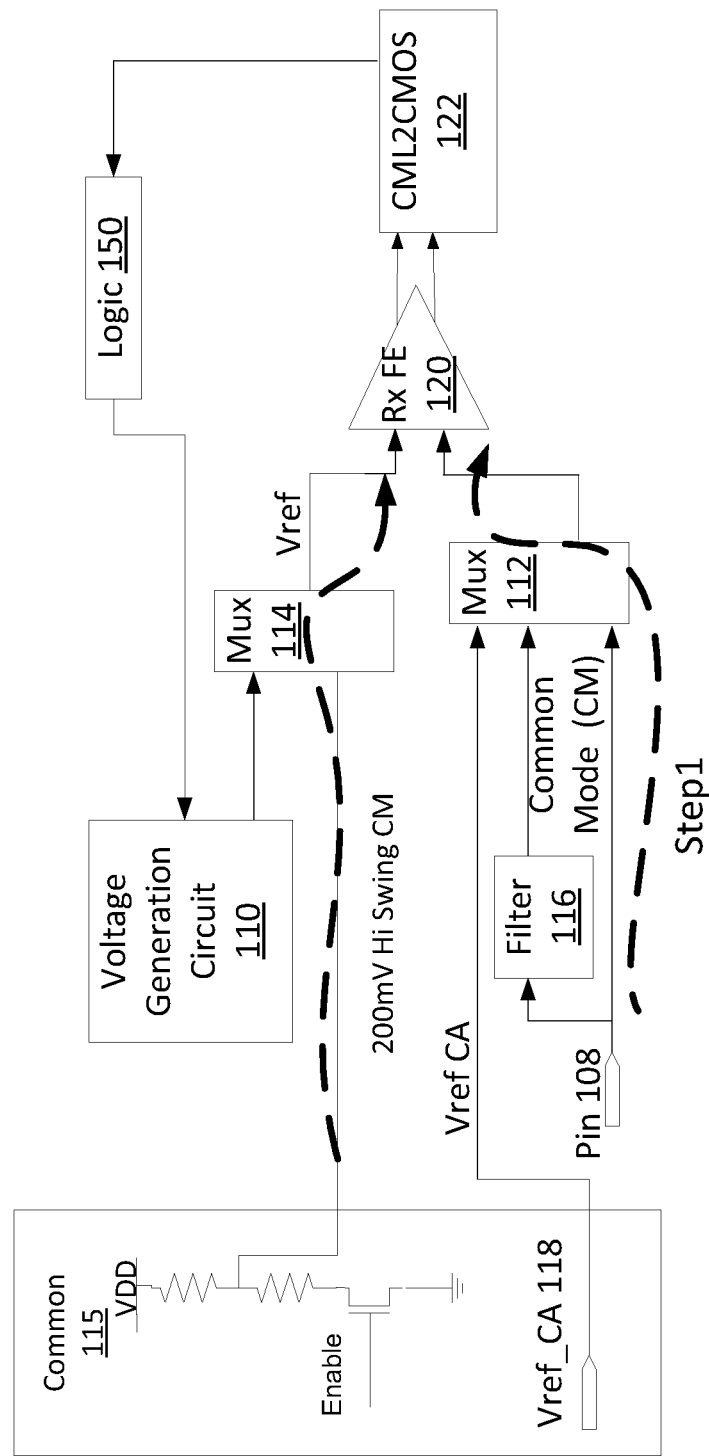
FIGS. 15-18 illustrate four steps of the transition from a high-swing mode to a low-swing mode according to one embodiment.
Figure 16:
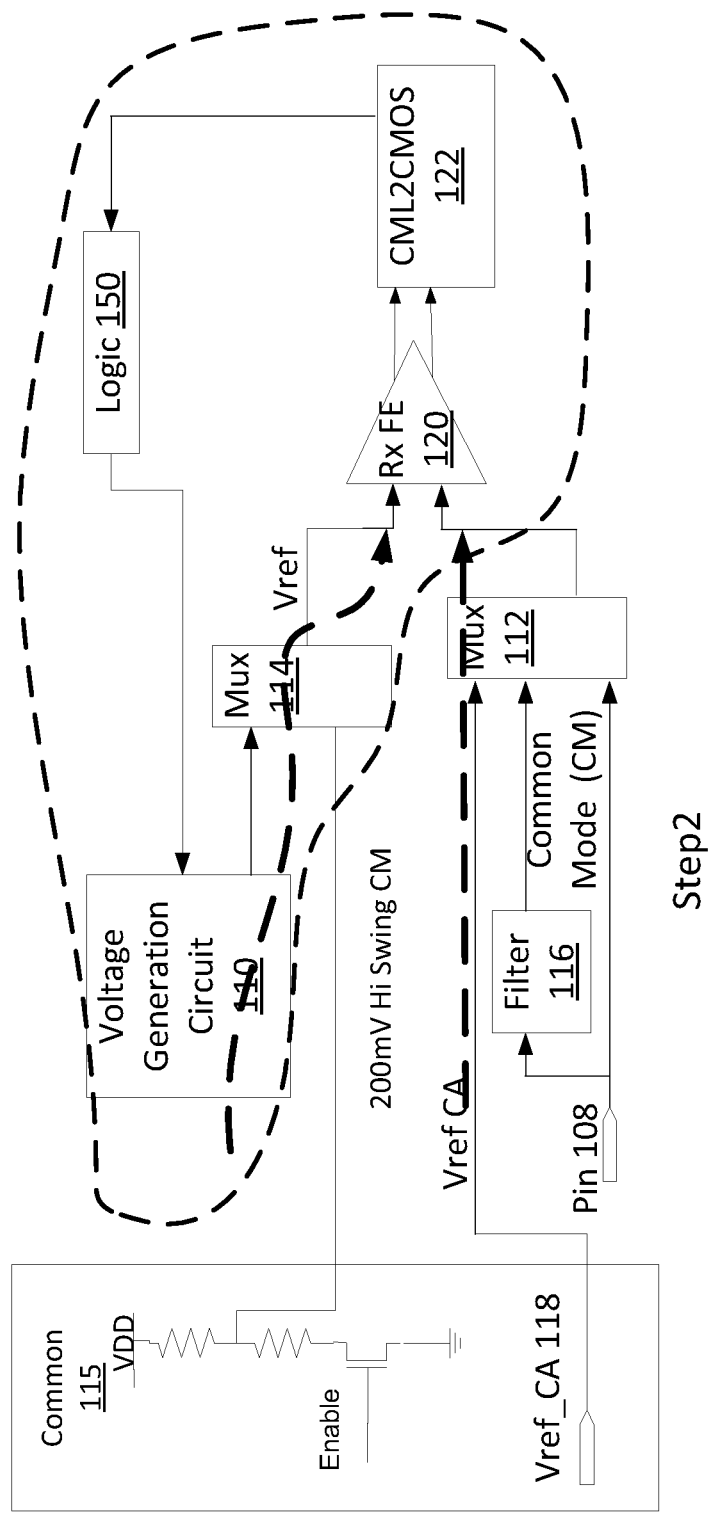
Figure 17:
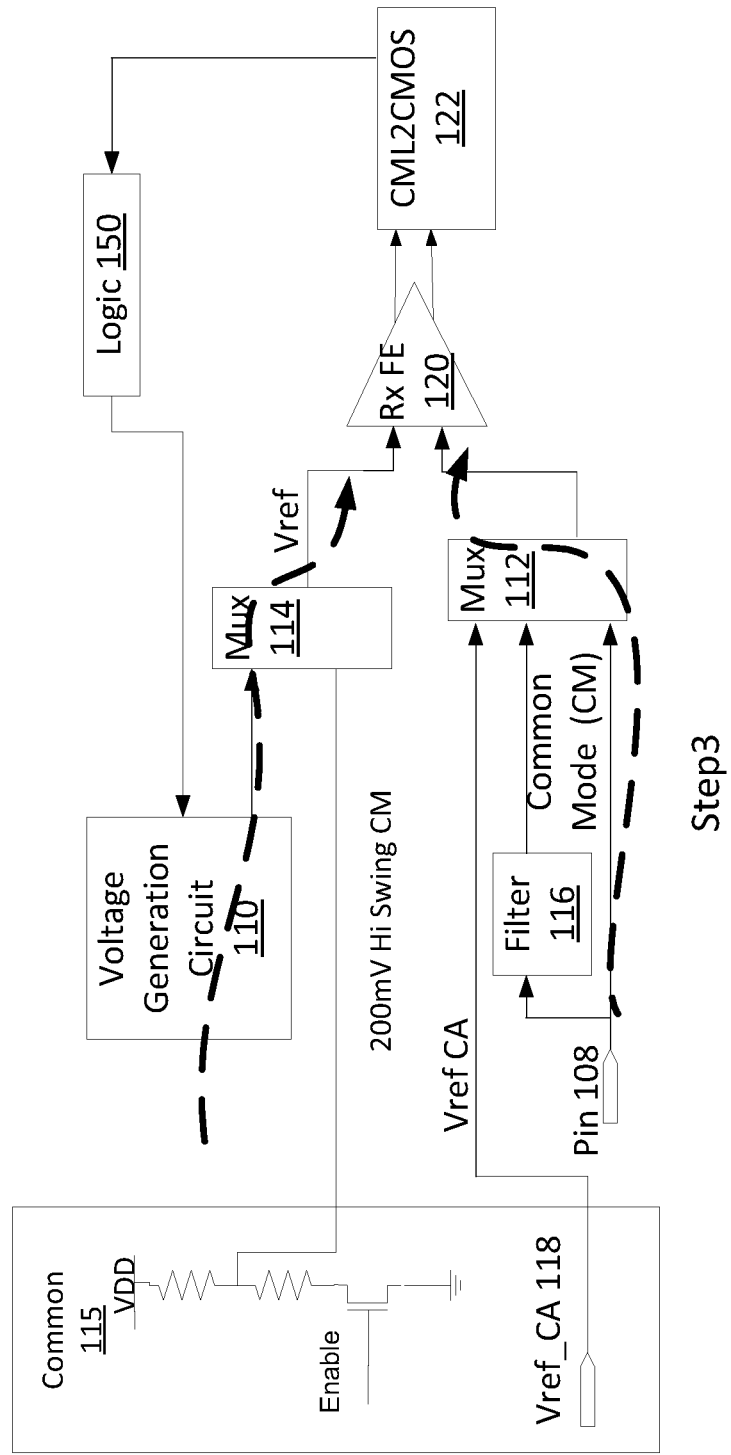
Figure 18:
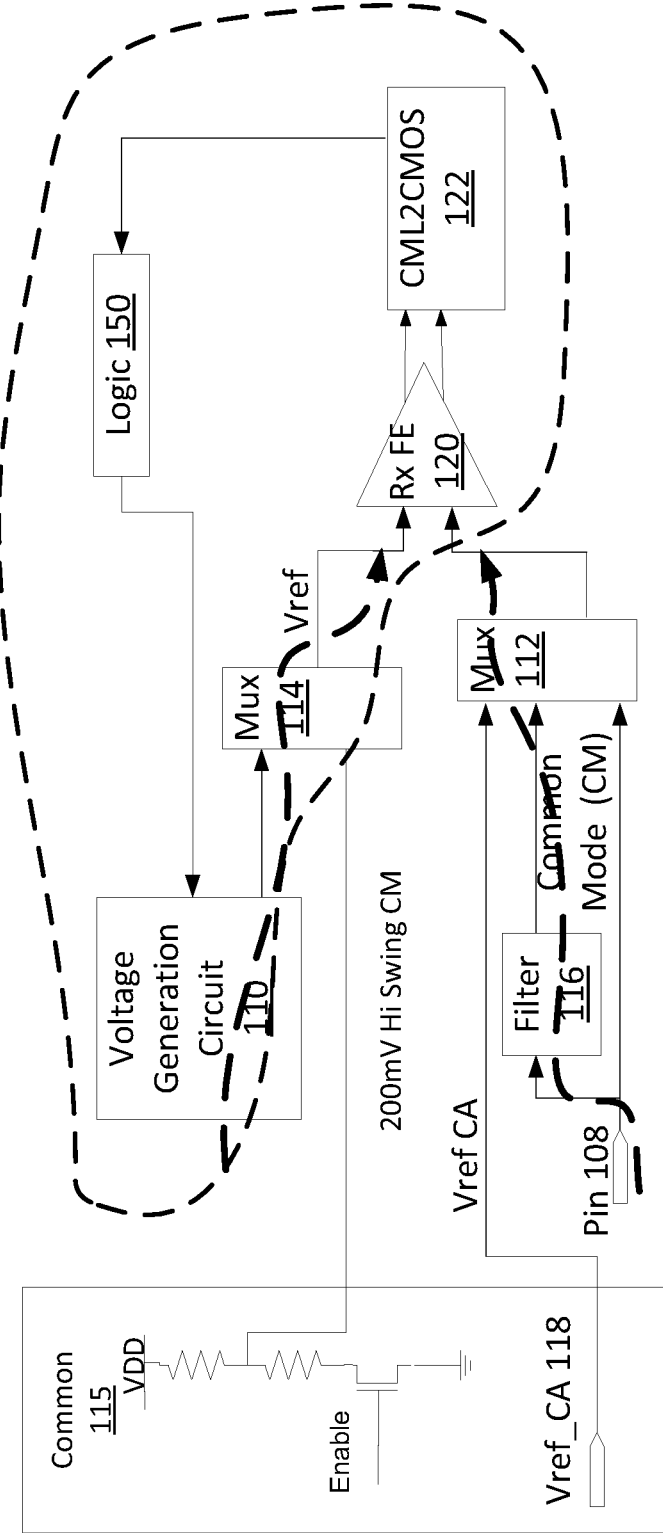

FIGS. 15-18 illustrate four steps of the transition from a high-swing mode to a low-swing mode according to one embodiment. FIG. 15 shows step 1 in which the second multiplexer 114 selects the default Vref for high swing (e.g., 200 mV) and the first multiplexer 112 selects the signal received on pin 108. The output of the first multiplexer 112 and the second multiplexer 114 are coupled to the preamp 120, which feeds into the CML2CMOS 122. The output of the CML2CMOS 122 is input into logic of the Vref calibration controller 150, which controls the voltage generation circuit 110. FIG. 16 shows step 2 in which the second multiplexer 114 selects the internal Vref generated by the voltage generation circuit 110, and the first multiplexer 112 selects the signal from the filter 116 to receive the calibration command. This can be done to calibrate the internal Vref. FIG. 17 shows step 3 in which the first multiplexer 112 selects the signal received on pin 108. FIG. 18 shows step 4 in which the first multiplexer 112 receives the signal from filter 116, and the second multiplexer 114 receives the internal Vref generated by the voltage generation circuit 110.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of operation in a flash integrated circuit (IC) memory device having an array of memory cells and an interface to receive control, address and data signals using an internal reference voltage, the method comprising:
    at boot-up, initializing the internal reference voltage to a default voltage, wherein, at boot-up, the interface is operable to receive, using the internal reference voltage, signals having a first voltage swing at a first signaling frequency; and
    receiving a first command that specifies calibration of the interface during a calibration mode, wherein the calibration mode is used to calibrate the interface to operate at a second signaling frequency and receive signals having a second voltage swing, wherein the second voltage swing is smaller than the first voltage swing and the second signaling frequency is higher than the first signaling frequency.

2. The method of claim 1, further comprising receiving a clock signal, wherein the clock signal is used to time reception of the first command by the interface.

3. The method of claim 2, wherein the clock signal operates at the first signaling frequency during boot-up and operates at the second signaling frequency during the calibration mode.

4. The method of claim 1, further comprising during the calibration mode, receiving a calibration pattern at the second signaling frequency.

5. The method of claim 4, wherein the calibration mode is used to calibrate the interface by calibrating the internal reference voltage based on the calibration pattern.

6. The method of claim 1, further comprising:
    receiving a second command that specifies exiting the calibration mode; and
    after exiting the calibration mode of the interface, receiving signals at the second signaling frequency.

7. The method of claim 1, further comprising receiving a signal that indicates commencement of the calibration mode.

8. A flash integrated circuit (IC) memory device comprising:
- an array of memory cells to store data;
- a circuit to generate an internal reference voltage, wherein, at boot-up, the internal reference voltage is a default voltage; and
- a receiver circuit including a plurality of receivers to receive control, address and data signals, the receiver circuit to receive a first command that specifies a calibration mode of the receiver circuit; and
- wherein, at boot up, the receiver circuit is operable to receive signals having a first voltage swing, wherein the calibration mode is used to calibrate the receiver circuit to receive signals having a second voltage swing, wherein the second voltage swing is smaller than the first voltage swing.

9. The flash IC memory device of claim 8, wherein, at boot up, the receiver circuit is operable to receive signals at a first signaling frequency, wherein during the calibration mode, the receiver circuit is to receive a calibration pattern at a second signaling frequency, wherein the calibration mode is used to calibrate the receiver circuit to operate at the second signaling frequency, wherein the second signaling frequency is higher than the first signaling frequency.

10. The flash IC memory device of claim 8, further comprising a pin to receive a clock signal, wherein the clock signal is used to time reception of the first command by the plurality of receivers.

11. The flash IC memory device of claim 10, wherein the clock signal operates at a first signaling frequency during boot-up and operates at a second signaling frequency during the calibration mode, wherein the second signaling frequency is greater than the first signaling frequency.

12. The flash IC memory device of claim 8, wherein the calibration mode is used to calibrate the receiver circuit to receive signals having a second voltage swing by calibrating the internal reference voltage.

13. The flash IC memory device of claim 8, wherein the receiver circuit is to receive a second command that specifies exiting the calibration mode of the receiver circuit.

14. A flash integrated circuit (IC) memory device comprising:
- an array of memory cells to store data;
- a circuit to generate an internal reference voltage, wherein, at boot-up, the internal reference voltage is a default voltage; and
- an interface having a plurality of receiver circuits coupled to a plurality of pins, each receiver circuit of the plurality of receiver circuits having a first input and a second input, the first input of each receiver circuit coupled to a respective pin of the plurality of pins, and the second input of each receiver circuit to receive the internal reference voltage,
- wherein, at boot up, the interface is operable to receive signals having a first voltage swing, the interface to receive a first command that specifies a calibration mode used to calibrate the internal reference voltage, the interface to receive signals having a second voltage swing using the calibrated internal reference voltage, wherein the second voltage swing is smaller than the first voltage swing.

15. The flash IC memory device of claim 14, further comprising a clock receiver circuit to receive a clock signal used to time reception of command/address signals by the plurality of receiver circuits.

16. The flash IC memory device of claim 15, wherein the clock signal operates at a first signaling frequency during boot-up and operates at a second signaling frequency during the calibration mode, wherein the second signaling frequency is greater than the first signaling frequency.

17. The flash IC memory device of claim 14, further comprising:
- a pin to receive an external reference voltage; and
- a circuit to selectively provide one of the internal reference voltage or external reference voltage to the interface.

18. The flash IC memory device of claim 14, wherein during the calibration mode, the interface is to receive a calibration pattern.

19. The flash IC memory device of claim 14, wherein, at boot-up, each receiver circuit of the plurality of receiver circuits is to operate at a first signaling frequency as a default frequency and wherein the interface is to receive a second command that specifies exiting the calibration mode.

20. The flash IC memory device of claim 14, wherein the calibration mode of the interface is used to calibrate receiver timing of the plurality of receiver circuits.

* * * * *